US010841776B2

(12) United States Patent
Murphy et al.

(10) Patent No.: US 10,841,776 B2
(45) Date of Patent: Nov. 17, 2020

(54) EMERGENCY REPORTING DEVICE AND SYSTEM

(71) Applicant: Allied Citizens Technologies, Inc., Austin, TX (US)

(72) Inventors: Michael F. Murphy, Austin, TX (US); Roy Paul Prosise, Cedar Park, TX (US); Benjamin Derek Litteral, Austin, TX (US); Daniel F. Caputo, Cedar Park, TX (US)

(73) Assignee: Allied Citizens Technologies, Inc., Austin, TX (US)

( * ) Notice: Subject to any disclaimer, the term of this patent is extended or adjusted under 35 U.S.C. 154(b) by 0 days.

(21) Appl. No.: 16/548,180

(22) Filed: Aug. 22, 2019

(65) Prior Publication Data

US 2020/0068375 A1  Feb. 27, 2020

Related U.S. Application Data

(60) Provisional application No. 62/721,118, filed on Aug. 22, 2018.

(51) Int. Cl.
*H04W 76/50* (2018.01)
*H04W 4/90* (2018.01)
*H04M 3/51* (2006.01)
*H04M 1/725* (2006.01)
*H04W 4/02* (2018.01)
*H04W 4/021* (2018.01)

(52) U.S. Cl.
CPC .......... *H04W 4/90* (2018.02); *H04M 1/72541* (2013.01); *H04M 3/5116* (2013.01); *H04W 4/022* (2013.01); *H04W 4/025* (2013.01); *H04W 76/50* (2018.02)

(58) Field of Classification Search
None
See application file for complete search history.

(56) References Cited

U.S. PATENT DOCUMENTS

| 2014/0355484 | A1* | 12/2014 | Foster | H04W 24/02 370/255 |
|---|---|---|---|---|
| 2018/0199546 | A1* | 7/2018 | Temel | A01K 27/001 |
| 2018/0308342 | A1* | 10/2018 | Hodge | G08B 25/016 |
| 2019/0020991 | A1* | 1/2019 | Hamilton | H04W 4/90 |

* cited by examiner

*Primary Examiner* — Gary Lafontant
(74) *Attorney, Agent, or Firm* — Lee & Hayes, P.C.

(57) ABSTRACT

Techniques for updating data operations in a perception system are discussed herein. A vehicle may use a perception system to capture data about an environment proximate to the vehicle. The perception system may receive image data, lidar data, and/or radar data to determine information about an object in the environment. As different sensors may be associated with different time periods for capturing and/or processing operations, the techniques include updating object data with data from sensors associated with a shorter time period to generate intermediate object data. Such intermediate object data may reduce a delay in updating a position of an object in an environment, which may improve reaction time(s) and/or safety outcomes in systems implementing such perception systems, such as an autonomous vehicle.

20 Claims, 14 Drawing Sheets

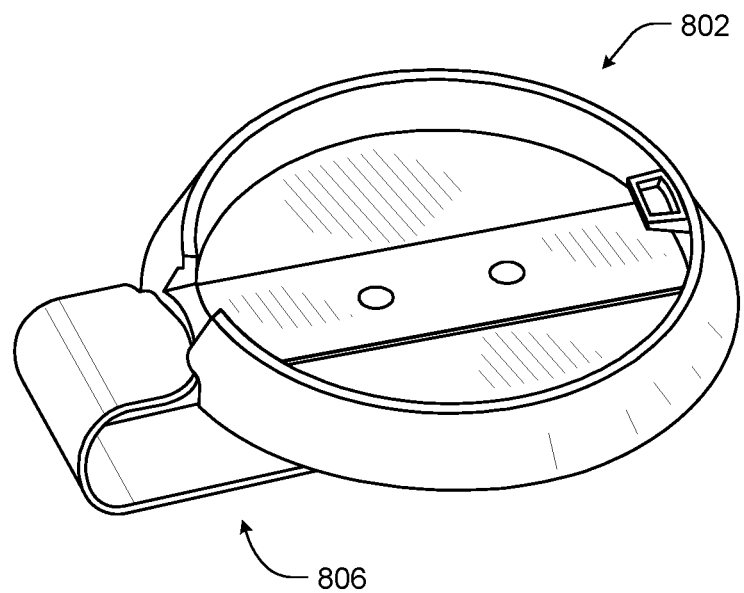
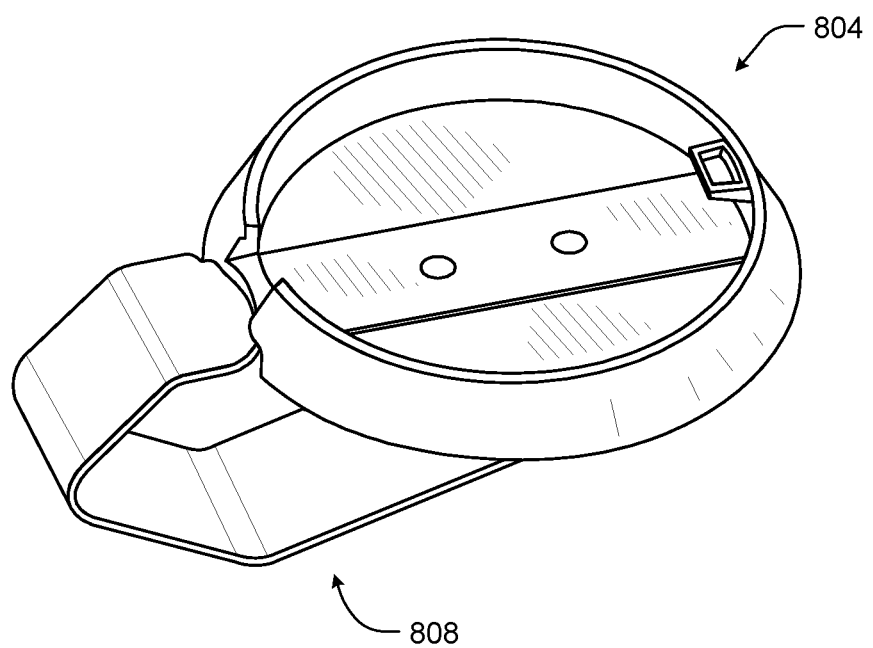
FIG. 8

EMERGENCY REPORTING DEVICE AND SYSTEM

CROSS-REFERENCE TO RELATED APPLICATION(S)

This application claims priority to U.S. Provisional Application No. 62/721,118, filed on Aug. 22, 2018 and entitled "Access Control System," the entirety of which is incorporated herein by reference.

BACKGROUND

Today, many individuals suffer injury or are in need of assistance but unable to contract proper authorities or individuals who are able and willing to assist. Even with the prevalence of mobile phones and smart devices, many individuals are unable to access and call emergency personal in a timely manner. For example, many individuals lock or require password access to their mobile phones or the smart device include a splash screen that must be bypassed to call emergency authorities, such as 911. In some cases, the smart devices may include an emergency contact on the splash screen, however, in some cases, the individual may be unable to swipe to access the splash screen or locate the emergency call button on the splash screen due to the nature of the emergency.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 8 is an example pictorial view of saddle with accessory clip according to some implementations.

DETAILED DESCRIPTION

Figure 1:
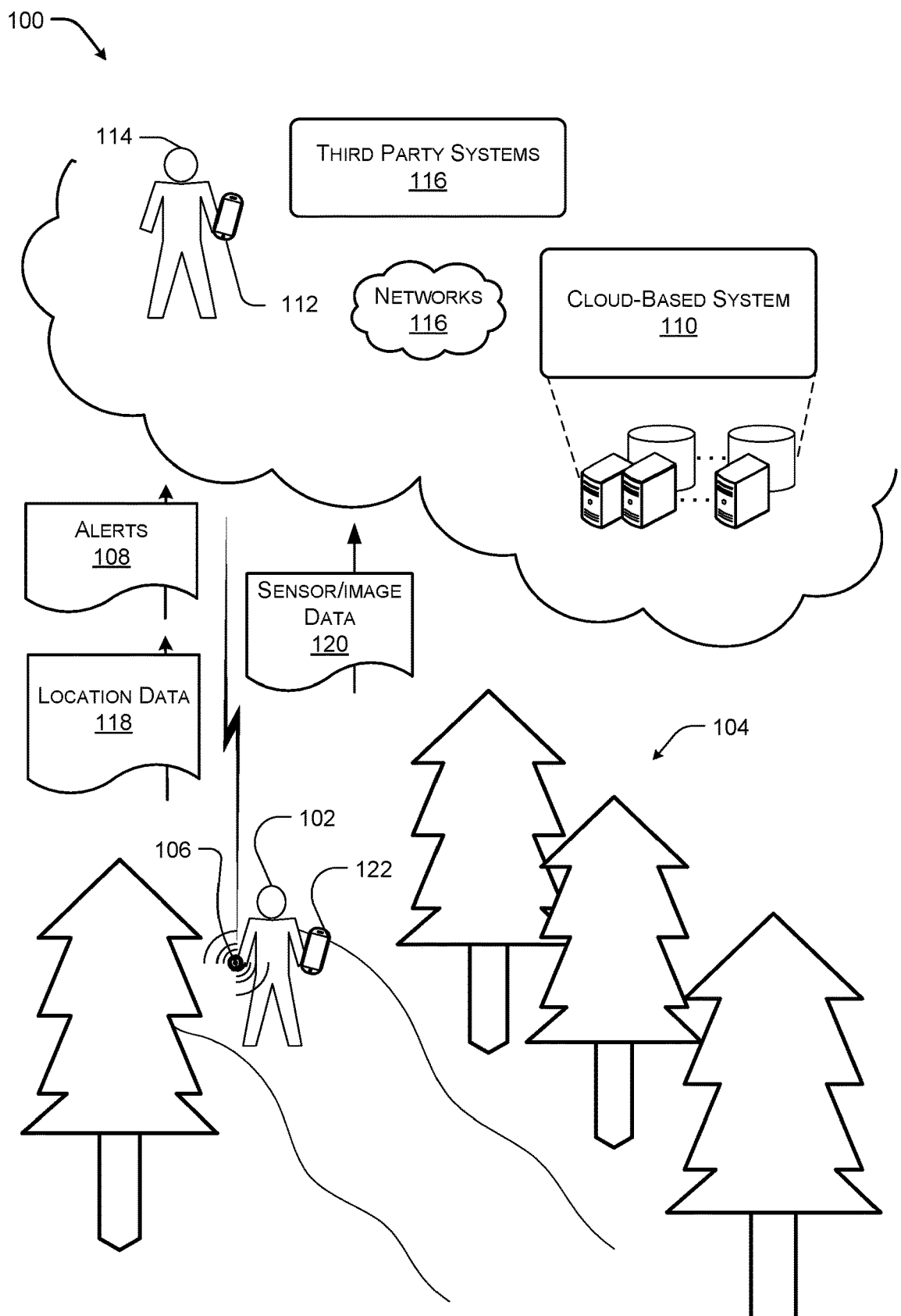
FIG. 1 illustrates an example environment including an environment in which a user may utilize the alert system according to some implementations.

This disclosure includes techniques and implementations for providing an alert system that allows for easy activation and communication with various emergency personnel, responders, and/or contacts. For example, the alert system may include an alert device configured to be in wireless communication with a mobile device (e.g., a smart phone, tablet, or other mobile device) such that in response to a user input, the alert device may cause the mobile device to contact emergency personnel (e.g., fire department, police department, health care responders, school or university personal, etc.), personal contacts (e.g., friends or family), as well as volunteers (e.g., individuals that have opted into alerts and are in physical proximity to the user requesting assistance).

In some cases, the alert device may include a pattern or trigger threshold. For instance, the alert device may send an alert in response to greater than a predetermined number of depressions within a predefined period of time or in session. In one example, the alert device may send the alert in response to one, two, three, or five depressions or presses in with less than a threshold period of time (e.g., one second, two seconds, or three seconds, etc.) of each other. In this manner, the alert device may prevent or reduce the number of false alerts sent to the responders due to, for instance, incidental contact with the alert device.

In some cases, the alert device may include multiple buttons that may each be set to cause the mobile device in wireless communication to respond in different ways. For example, the alert device may include an unlock button (or combination of buttons, such as an ordered passcode), an emergency button, volume or other media control buttons, and call handling buttons (e.g., answer or silence). In some cases, each of the buttons may be programmed or set to preform various actions by the user. For example, the user may configure to the alert device having one button to unlock in response to one depression, to contract a first contact in response to two depression, a second contract in response to three depression, or emergency personnel in response to four depressions. It should be understood, that the number of depressions associated with a particular operation may vary in other implementations.

In some examples, the alert system may also include an application hosted on a mobile device in wireless communication with the alert device. The application may be configured to allow the user to set the commands or responses caused by the alert device when depressed, as discussed above. The application may also be used to select responders, such as friends and family, that should be contracted when the alert device is triggered. The application may also be configured to select or input the contents of the alerts. For example, the user may input desired hospital, address, allergies, primary care physician, individuals to be contacted by the hospital, blood type, any known medical condition, or other medical information, etc.

In some cases, the application may allow the user to set check-in times or periods. For example, the application may send an alert to a designated responder if the user does not check in with the application within a specific period of time (such as one hour, two hours, overnight, etc.). The application may send an alert to a designated responder if the user does not check in with the application at specific times (such as, for example, 8:00 p.m., 7:00 a.m., between 7:00-9:00 a.m. on Monday, etc.). In some cases, the application may cause a hosting device to provide feedback to the user that a check-in is required. For instance, the device may vibrate, ring, play a song, or display a visual notification, etc. to cause the user to respond. In some cases, the user may respond by selecting an input on the mobile device while in other cases, the user may respond by selecting or depressing the alert device a specific number of times (such as once).

In some cases, the application may also allow the user to designate the responders (such as friends, family, physicians, etc.) by selecting contacts, entering phone numbers, entering email addresses, or selecting available emergency or medical. In some cases, the responders may be selected by the application based for instance on a geolocation of the device at the time the alert device is activated.

In some case, the application and/or the alert device may be configured to send data to emergency personnel or responders to assist with providing aid to the user. For instance, the alert system may track location data, such as via a GPS system on the device, or via a GPS antenna associated with the alert device. In this manner, the responders know an approximate location associated with the activation of the alert device. In other cases, the application may activate microphones, image capture devices, as well as well as other sensors associated with the hosting device in responders to an alert, and send the captured sensor, image, and/or audio data to the responders. In one specific example, the application may stream location information, audio data, or image data to the responders.

In some cases, the alert device may be configured to attach or adhere to the mobile device, such as the back of a smartphone or tablet. In other cases, the alert device may be configured to attach to a keychain, necklace, etc. In still other cases, the alert device may be confirmed to attach to clothing, backpacks, or other articles in proximity to the user. For instance, in some particular examples, the alert device may be configured to releasably couple to a saddle. In this example, the saddle may include an adhesive that may be coupled to the back of the mobile device, such that the alert device may be locked onto the back of the mobile device via the saddle when the user has the mobile device in easy access (such as in the user's hands). In this example, the alert device remains removable from the mobile device (e.g., is released from the saddle), such that the alert device may be placed or remain within easy access to the user (e.g., attached to a necklace, backpack strap, belt loop, etc.) when the mobile device is nearby but put away (e.g., in a backpack, purse, back pocket, etc.).

In some cases, the saddle may be configured with removable adhesive, such that the saddle may be removed from one surface and reattached to other surfaces. In some cases, the saddle may be formed from flexible materials, such as rubber, plastics, polymers (such as polyurethane), among others, so as to protect the alert device from impact. In other cases, the saddle may be formed from hard materials, such as aluminum, steel, or other alloys. In still other cases, the saddle may be formed from a combination of flexible and hard materials to provide, for instance, a ridged exterior and a flexible interior.

In some cases, the alert device or the saddle may be equipped with additional electronic components. For example, the saddle may include a backup battery that may be recharged. In another example, either the alert device or the saddle may include microphones, image devices or components, or sensors (e.g., accelerometers, gyroscopes, magnetometers, etc.) that may be used to collect data associated with the physical environment useful to the responders. In some particular cases, the alert device or saddle may be equipped with global positions system (GPS) receivers to collect location data for the responders. In some cases, the various additional electronic components may be activated in response to a depression of the alert device.

In the examples above, the alert device is in wireless communication with a mobile device proximate to the alert device. In alternative examples, the alert device may be configured to access cellular networks, such that the device may alert responders without a mobile electronic device in proximity. In one particular example, the alert device may be associated with a private network, such as a university, school, hospital, or other campus network. In this example, the alert devices may be provided to designated personal (e.g., employees, facility, security, etc. associated with the campus), and, thus, the use of the alert devices may be restricted to accountable personal.

FIG. 1 illustrates an example environment including an environment in which a user may utilize the alert system 100 according to some implementations. In the current example, a user 102 may be walking through a physical environment 104 (such as the woods) and encounter an emergency or otherwise require assistance. For instance, the user may fall and be unable to get back up. In this example, the user 102 may trigger an alert device 106. For instance, the user 102 may depress the alert device 106 a predetermined number of times to trigger the alert.

The alert device 106 may then send an alert 108 to a cloud-based system 110 associated with the alert system 100, electronic devices 112 associated with other users 114, or other third-party system 116, such as emergency responders, or one or more networks 116. In some cases, the alert 108 may include information usable by a responder or the cloud-based system 110 to identify the identity of the user, such as a unique identifier. In some cases, in addition to the alert 108 or notification that the user 102 is requesting assistance, the alert device 106 may cause location data 118 and/or sensor/image data 120 to be provided to the responders and/or the cloud-based system 110. For instance, the location data 118 may be usable by the responders to more quickly or easily locate the user. Similarly, the sensor/image data 120 may be usable by the emergency dispatchers or the cloud-based system 110 to better understand the emergency and to more properly dispatch the correct type of responders (e.g., medical responders, policy responders, fire responders, etc.). The sensor/image data 120 may also help responders be more prepared when responding to the emergency at hand.

In some cases, the alert device 106 may be configured to communicate with the responders, while in other cases, the alert device 106 may be paired with an electronic device 122 which may send the alerts 108, the location data 118, and/or the sensor/image data 120 to the responders and/or the cloud-based system 110 in response to the user activating the alert device 106. In these examples, since the alert device 106 may be attached to various articles, such as clothing, belts, back straps, or even the electronic device 122, the alert device 106 may be more easily accessed by the user during an emergency.

Figure 2:
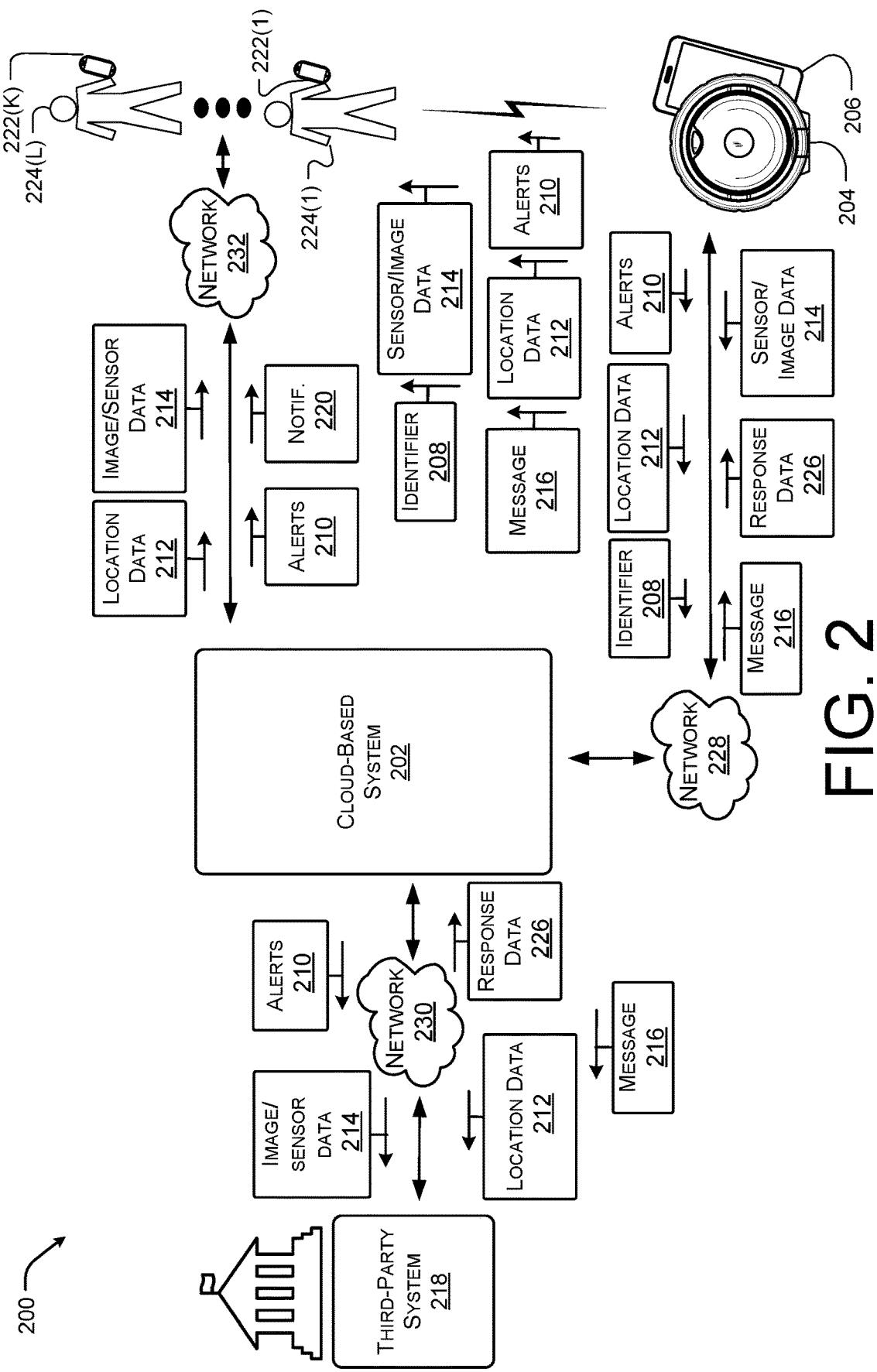
FIG. 2 illustrates an example block diagram of an alert system according to some implementations.

FIG. 2 illustrates an example block diagram of an alert system 200 according to some implementations. In the current example, the system 200 may include a cloud-based system 202 and at least one alert device 204 paired with an electronic device 206 and associated with a user. In the current example, the cloud-based system 202 may be in communication with the alert device 204 and/or the electronic device 206, such that the alert device 204 and/or the electronic device 206 may send alerts 210 as well as location data 212, and sensor/image data 214 (e.g., image data, video data, motion data, impact data, audio data, etc.) to the cloud-based system 202. In some cases, the alert device 204 and/or the electronic device 206 may also send a unique identifier 208, such as a device ID or user ID, to the cloud-based system 202 so that the identity of the user requesting assistance is known.

In some cases, the cloud-based system 202 may receive the alerts 210 as well as the data 212 and 214 in response to an activation of the alert device 204. In these cases, the cloud-based system 202 may then send the alerts 210 and the data 212 and 214 to third party systems 218 (such as emergency responders). The cloud-based system 202 may also send the alerts 210 and the data 212 and 214 to various devices, such as devices 222(1)-(K), associated with various individuals, such as individuals 224(1)-(L). For example, the individuals 224(1)-(L) may be individuals previously indicated by a user of the alert device 204 (e.g., individuals selected by the user prior to activation of the alert device 204). In another example, the individuals 224(1)-(L) may be individuals that are proximate to or in nearby a physical position indicated by the location data 212.

In general, cloud services, such as the cloud-based system 202 may generally refer to a network accessible platform implemented as a computing infrastructure of processors, storage, software, data access, and so forth that is maintained and accessible via a network such as the Internet. The cloud-based system 202 does not require end-user knowledge of the physical location and configuration of the system that delivers the services. Common expressions associated with cloud services include "on-demand computing", "software as a service (SaaS)", "platform computing", "network accessible platform", and so forth.

In one specific example, the alert device 204 and/or the electronic device 206 may also send out a request via various sort range wireless communication channels to nearby devices 222(1)-(K). In this specific example, the user may receive aid by those that are in the best position able to respond in a timely manner. For example, the individuals 224(1)-(L) may be within a predefined distance of the devices 204 and 206 when the alert device 204 is activated. In some cases, the individuals 224(1)-(L) may opt in or volunteer to be a general responder that may receive alerts when an alert device 204 is activated in a nearby area. In one instance, the opting in individuals 224(1)-(L) may specify types of emergencies that the individuals 224(1)-(L) are willing to respond to and the application on the electronic device 206 or the cloud-based system 202 may direct the alert 210 to the individuals 224(1)-(L) based on both the location data 212 and the type of emergency determined by analyzing the sensor/image data 214.

In some examples, the alerts 210 may also include a message 216 input by the user of the alert device 210. In some cases, the message 216 may be predefined or entered by the user into the electronic device 206 prior to an activation of the alert device 210. Alternatively, the user may enter the message 216 after activation of the alert device 204 to, for example, provide additional information related to the emergency. In some cases, the message 216 may be audio, video, or text based.

In some cases, the cloud-based system 202 may generate notifications 218 associated with the alert system 200. For example, the user may set a check in time or period using an application on the electronic device 206. In these cases, if the user does not activate the alert device 204 or provide an input to the electronic device 206, the cloud-based system 202 may be configured to send the notification 218 to one or more of the devices 222(1)-(K) associated with one or more of the individuals 224(1)-(L).

The notifications 220 may include a request to the receiving individuals 224(1)-(L) to check in, call or contact the user and to alert emergency responders if the individuals 224(1)-(L) are unable to connect with the user. In some cases, the notification 220 may include information related to the activity and location that the user was engaged with (e.g., hiking in the valley, dinner date with Fred, shopping with Emily at a River Place, going to the theater downtown, etc.).

In some specific examples including hostile individuals, such as an active shooter, the cloud-based system 202 may attempt to triangulate a location of the hostile individual or shooter and provide the location as part of the alerts 210 and/or the notification 202. For instance, the cloud-based system 202 may utilize the location data 212 as well as the sensor/image data 214 received from the devices 204 and/or 206 to identify the location of the hostile individual. In some cases, the cloud-based system 202 may also utilize sensor/image data 214 to attempt to identify or provide images of the hostile individual as part of the alert 210 and/or notification 202. In one instance, the cloud-based system 202 may parse and/or correlate image data 214 collected by multiple active devices 204 or the accoupling devices 206 to identify a common individual. In another instance, the cloud-based system 202 may parse the image data 214 to detect specific objects, such as weapons, masks, etc. or clues, such as hostile body language, in identifying the hostile individual.

In the cases of the hostile individual, the cloud-based system 202 may notify designated personal (such as law enforcement, facility, campus personal, others trained for emergency repose situations). The system 202 may also allow for the emergency responders to communicate, such as text, voice calls, or video conference, with the user's that have activated the device 204 in order to better collect information on the situation. The system 202 may also allow the user's to stream video and/or audio data 214 directly to the responders via the cloud-based system 202 to allow the responders to understand the real-time environment at the emergency.

In some cases, the third-party system 218 or the cloud-based system 202 may generate response data 226 that may be sent back to the electronic device 206 to provide the user with feedback on the responders or actions taken by the third-party systems 218 and/or the cloud-based system 202. For example, the response data 226 may include information related to when assistance will arrive (for example, a live stream to a GPS map including a position of the responders), who was dispatched (e.g., policy, fire department, ambulance, the user's parents, the user's best friend, name of the 10 nearby volunteer responders), and request for additional information if possible, etc. In some cases, the response data 226 may include name, picture, age, and sex of the responders so the user may be aware that the person providing assistance is associated with the alert system 200.

In the current example, the cloud-based system 202, the alert device 204, the electronic device 206, the devices 222(1)-(K), and the third party systems 218 may be in communication with each other through various networks, such as networks 228-232 as illustrated. The networks 228-232 may be associated with various communication technologies, for example, via wired technologies (e.g., wires, USB, fiber optic cable, etc.), wireless technologies (e.g., RF, cellular, satellite, Bluetooth, Internet®, etc.), or other connection technologies. In general, the networks 228-232 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 3:
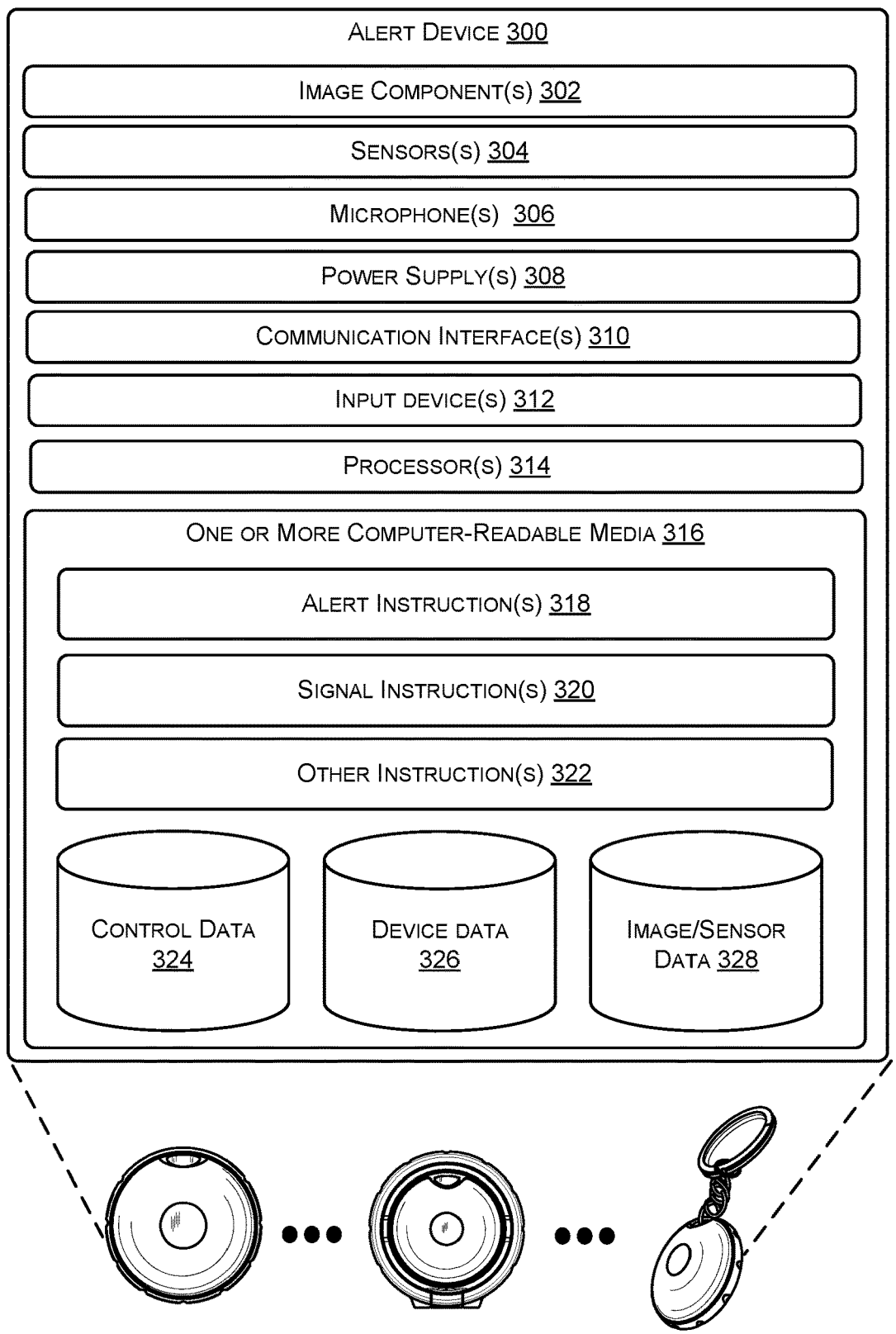
FIG. 3 illustrates example components of an alert device according to some implementations.

FIG. 3 illustrates example components of an alert device 300 according to some implementations. As described above, the alert device 300 may be a standalone device that is in shortrange wireless communication with nearby electronic devices. For example, the alert device 300 may be configured such that in response to an activation, the alert device may cause the electronic device to send an alert to a cloud-based system, third-party responder, or nearby devices associated with the alert system.

In the current example, the alert device 300 may include image components 302 for capturing visual data, such as images or frames, from a physical environment (e.g., the venue, the container, the merchandise, etc.). For example, the image components 302 may be positioned to capture multiple images of the physical environment or an area proximate to the user and the alert device 300.

In some cases, the alert device 300 may include one or more sensors 304 to collect access data as well as other data, such as impact data, motion data, weight data, pressure data, etc. associated with the alert device 300. For instance, the sensors 304 may include one or more accelerometers, one or more gyroscopes, one or more magnetometers, one or more presence sensors, and/or one or more pressure sensors, as well as other sensors.

The alert device 300 may also include one or more microphones 306 for capturing audio data from the physical environment. The microphones 306 may be one or more microphones or an array of microphones associated or positioned around the alert device 300 to capture sound in the physical environment as well as directionally of the sound.

In the illustrated example, the alert device 300 also includes a power supply 308, such as a battery. In some cases, the alert device 300 may be configured to include an internal battery that powers the other components discussed herein, such as the sensors 304 and the power supply 308 is configured to recharge from an external power source. In one specific example, the alert device 300 may be configured to generate an alert to a responder or a notification for the user if the external power supply is interrupted or disabled. In some cases, the power supply 308 may be rechargeable or replaceable. In other cases, the power supply 308 may be integrated into the alert device 300, such that once the power supply 308 is depleted, the alert device 300 should be replaced by the user.

The alert device 300 may also include one or more communication interfaces 310 configured to facilitate communication between one or more networks, one or more cloud-based system and/or one or more local devices (such as an associated and/or paired electronic device of the user). The communication interfaces 310 may also facilitate communication between one or more wireless access points, a master device, and/or one or more other computing devices as part of an ad-hoc or home network system. The communication interfaces 310 may support both wired and wireless connection to various networks, such as cellular networks, radio, WiFi networks, short-range or near-field networks (e.g., Bluetooth®), infrared signals, local area networks, wide area networks, the Internet®, and so forth.

The alert device 312 may also include one or more user input devices 312. For example, the input devices 312 may be a mechanical input device (e.g., depressible button, slidable button, rotatable button, or other actable component) or touch enabled component or sensor (e.g., pressure sensor, capacitive touch sensor, resistive touch sensor, etc.). the input devices 312 may allow the user to activate the alert device 300. In some cases, the alert device 300 may include multiple input devices 312 that may be programed by the user to cause a paired electronic device to perform various actions including, for instance, sending alerts, controlling electronic device setting, unlocking the electronic device, enabling the electronic device, among others.

The alert device 300 may also include one or more processors 314, such as at least one or more access components, control logic circuits, central processing units, or processors, as well as one or more computer-readable media 316 to perform the function associated with the alert device 300. Additionally, each of the processors 314 may itself comprise one or more processors or processing cores.

Depending on the configuration, the computer-readable media 316 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 314.

Several modules such as instruction, data stores, and so forth may be stored within the computer-readable media 316 and configured to execute on the processors 314. For example, as illustrated, the computer-readable media 316 store alert instructions 318 and signal instructions 320, as well as other instructions 322. The computer-readable media 316 may also store data, such as control data 324 (e.g., predefined commands or input threshold associated with the action the user desires the paired electronic device to perform in response to the user inputs at the input devices 312), device data 326 (e.g., paired device data), and image/sensor data 328 (e.g., data collected by the image components 302, the sensors 304, and/or the microphones 306).

The alert instructions 318 may cause the alert device 300 to cause the electronic device indicated by the device data 326 (e.g., the paired device) to send an alert. In some cases, the alert instructions 318 may be configured to determine the number of user inputs at the input devices 312 and to send an alert in response to a predetermined number of user inputs (e.g., three or more inputs within a predefined period of time).

The signal instructions 320 may be configured to cause the alert device 300 to cause the electronic device indicated by the device data 326 (e.g., the paired device) to perform an action based on the control data 324, such as unlocking the electronic device.

Figure 4:
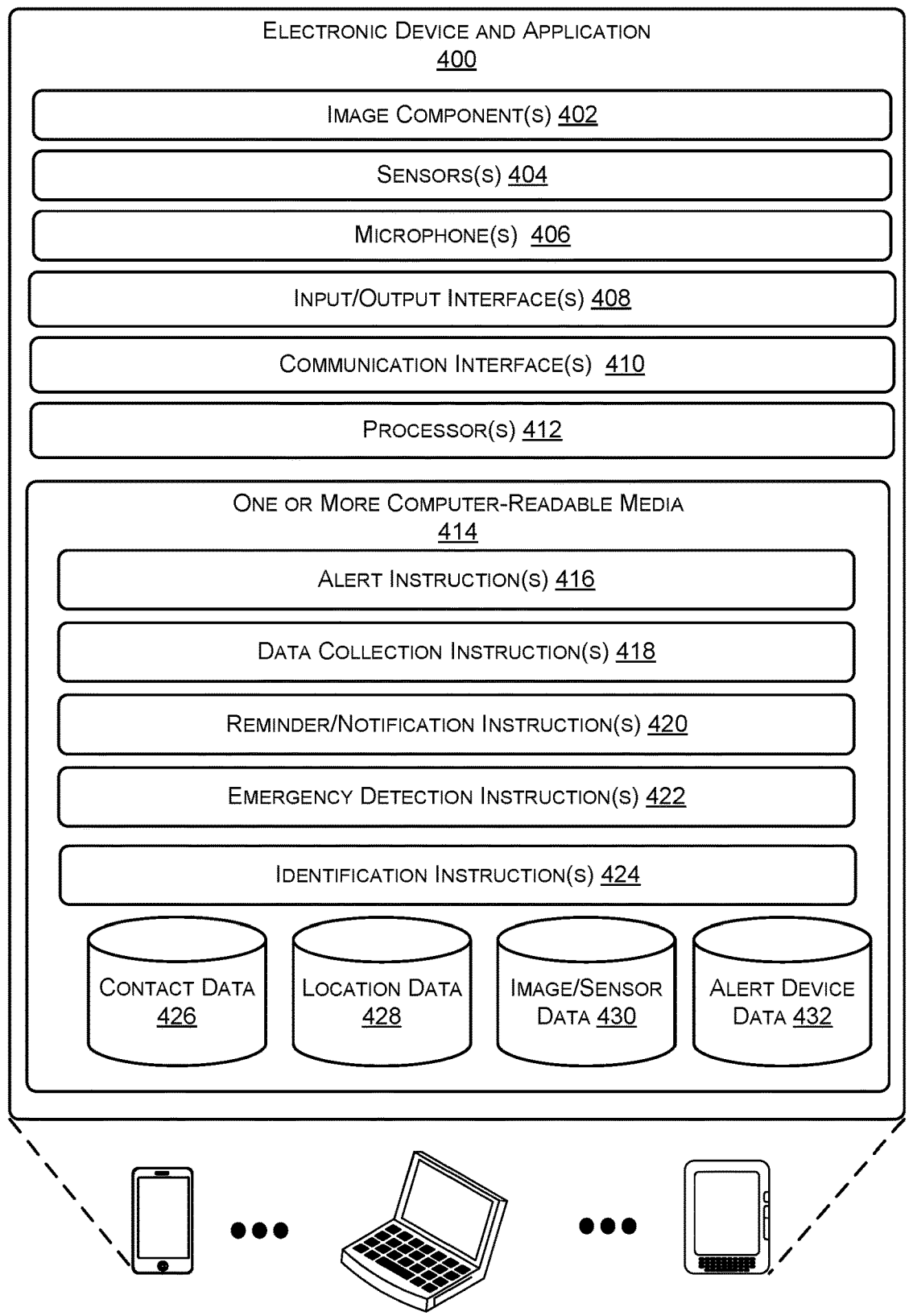
FIG. 4 illustrates example components of a user access device associated with the alert system according to some implementations.

FIG. 4 illustrates example components of an electronic device and application 400 associated with the alert system and paired to the alert device according to some implementations. For instance, the alert device may be configured to provide only short-range communication to a paired device to thereby extend the lifetime of the alert device and reduce the overall costs of the alert device. In these instances, the alert device may be communicatively coupled or paired to the electronic device and application 400 which may be in further communication with cloud-based systems and third-party responders, as discussed above.

In the current example, the electronic device and application 400 may include image components 402 for capturing visual data, such as images or frames, from a physical environment (e.g., the venue, the container, the merchandise, etc.). For example, the image components 402 may be positioned to capture multiple images of the physical environment or an area proximate to the user, the alert device, and/or the electronic device and application 400.

In some cases, the electronic device and application 400 may include one or more sensors 404 to collect access data as well as other data, such as impact data, motion data, weight data, pressure data, etc. associated with the electronic device and application 400. For instance, the sensors 404 may include one or more accelerometers, one or more gyroscopes, one or more magnetometers, one or more presence sensors, and/or one or more pressure sensors, as well as other sensors.

The electronic device and application 400 may also include one or more microphones 406 for capturing audio data from the physical environment. The microphones 406 may be one or more microphones or an array of microphones associated or positioned around the electronic device and application 400 to capture sound in the physical environment as well as directionally of the sound.

The electronic device and application 400 may also include one or more user input/output interfaces 408. For example, the input/output interfaces 408 may include one or more output components, such as a display or touch screen, and one or more input components, such as keyboards, keypads, j oysticks, a mouse, a touch screen, touch pad, drawing pad, or control buttons. In some implementations, the output components and input components are combined in a single user interface to provide a touch-sensitive display, or touch screen display. For instance, in the illustrated example, the input/output interfaces 408 includes one or more displays for presenting information to a user and one or more touch sensors for accepting input resulting from contact and/or application of incident force, such as a user finger or stylus pressing upon one of the display.

The electronic device and application 400 may also include one or more communication interfaces 410 configured to facilitate communication between one or more networks, one or more cloud-based system and/or one or more alert devices. The communication interfaces 410 may also facilitate communication between one or more wireless access points, a master device, and/or one or more other computing devices as part of an ad-hoc or home network system. The communication interfaces 410 may support both wired and wireless connection to various networks, such as cellular networks, radio, WiFi networks, short-range or near-field networks (e.g., Bluetooth®), infrared signals, local area networks, wide area networks, the Internet®, and so forth).

The electronic device and application 400 may also include one or more processors 412, such as at least one or more access components, control logic circuits, central processing units, or processors, as well as one or more computer-readable media 414 to perform the function associated with the alert system. Additionally, each of the processors 412 may itself comprise one or more processors or processing cores.

Depending on the configuration, the computer-readable media 414 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 412.

Several modules such as instruction, data stores, and so forth may be stored within the computer-readable media 414 and configured to execute on the processors 412. For example, as illustrated, the computer-readable media 414 store alert instructions 316, data collection instructions 418, reminder/notification instructions 420, and emergency detection instructions 422, identification instructions 424 as well as other instructions. The computer-readable media 414 may also store data, such as contact data 426 (e.g., contact information for individuals the user may designate as responders, preferred responders, emergency numbers, etc.), location data 428 (e.g., position information associated with the electronic device, user, and/or alert device), image/sensor data 430 (e.g., data collected by the image components 402, the sensors 404, and/or the microphones 406), and alert device data (e.g., data associated with a communicatively coupled or paired alert device), and alert device data 432 (e.g., data associated with the users and the alert devices associated therewith).

The alert instructions 416 may first identify responders, third-party systems, cloud-based system, or other devices associated with the alert system within a physical area around the electronic device 400 and send the identified entities an alert in response to an activation of a wireless coupled or paired alert device. The alert instructions 416 may identify the entities via the contact data 426 or the location data 428. For example, the user may select contacts (e.g., friends, family, hospitals, police, etc.) from the contact data 426 to send the alerts to in response to an activation of the alert device.

The data collection instructions 418 may be configured to enable the image components 402, the sensors 404, and/or the microphones 406 in response to a user activation of a corresponding alert device. The data collection instructions 418 may also cause the data collected (e.g., the image/sensor data 428) to be sent to various third-party systems, nearby volunteer responder devices, and/or the cloud-based system, as discussed above.

The reminder/notification instructions 420 may be configured to prompt the user for input via either the alert device or the input/output interfaces 408. In the situation in which the user fails to respond, the reminder/notification instructions 420 may be configured to send an alert or notification to entities or individuals selected by the user within the contact data 426. For example, if the user does not provide feedback within a 2 hours window, the reminder/notification instructions 420 may cause a notification to be provided to a family member or friend of the user. If the user then goes another hour without providing feedback, the reminder/notification instructions 420 may send an alert to emergency responders or the cloud-based system. In another example, the user may set a time such as 9:00 p.m. and if the user does not provide feedback by the designated time, the reminder/notification instructions 420 may send the notification to the family member or friend. If the user then does not provide feedback by 9:30 p.m., the reminder/notification instructions 420 may then send the alert to emergency responders or the cloud-based system.

The emergency detection instructions 422 may allow the user to act as a volunteer responder. For example, the emergency detection instructions 422 may allow the user to opt in to receive alerts from other users. For example, if a nearby user triggered an alert, the emergency detection instructions 422 may receive the alert, cause the device 400 to notify the user (e.g., via tactile, audio, or visual cues) that there is an emergency in progress nearby. In some cases, the emergency detection instructions 422 may cause a map to be displayed on the input/output interface 408 such that the user may quickly locate and assist the other user.

The identification instructions 424 may be configured to utilize sensor/image data 430 to identify or provide images of the hostile individual or the emergency situation. In one instance, the identification instructions 424 may parse and/or correlate image data 430 collected by multiple active devices or the accoupling devices to identify a common individual. In another instance, the identification instructions 424 may parse the image or sensor data 430 to detect specific objects, such as weapons, masks, etc. or clues, such as hostile body language, in identifying the hostile individual.

In the cases of the hostile individual, the identification instructions 424 may cause the alert instructions 416 to notify designated or specific personal (such as law enforcement, fire response, health officials, facility, campus personal, others trained for emergency repose situations). For example, if a fire is identified from the image or sensor data 430, then the alert instructions 416 may notify fire responders, while if an active shooter is identified from the image or sensor data 430, then the alert instructions 416 may alert policy and/or security responders.

Figure 5:
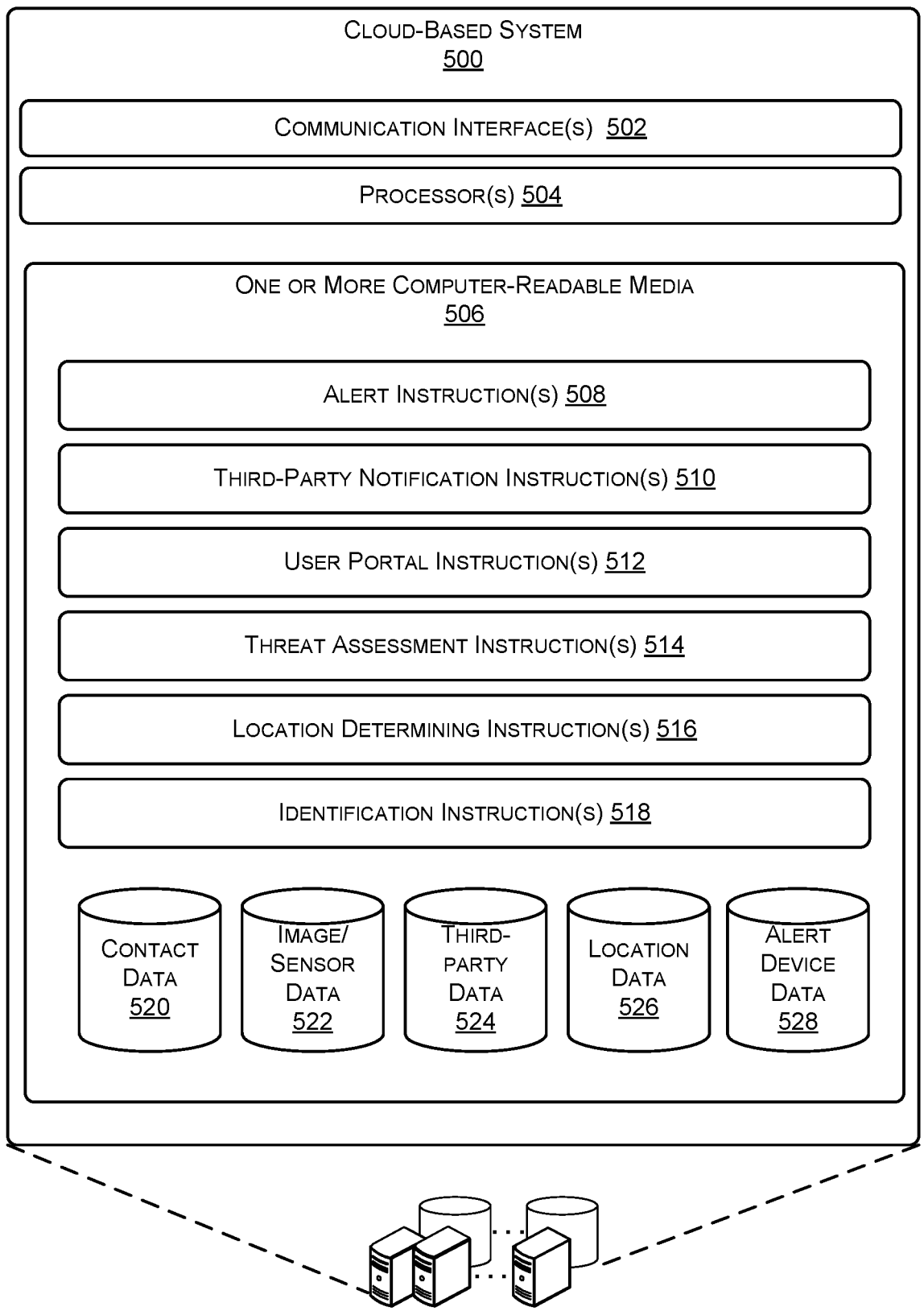
FIG. 5 illustrates example components of a cloud-based system associated with the alert system according to some implementations.

FIG. 5 illustrates example components of a cloud-based system 500 associated with the alert system according to some implementations. In general, cloud-based system 500 is a cloud services associated with the alert system and, as discussed above, may generally refer to a network accessible platform implemented as a computing infrastructure of processors, storage, software, data access, and so forth that is maintained and accessible via a network such as the Internet. The cloud services do not require end-user knowledge of the physical location and configuration of the system that delivers the services. Common expressions associated with cloud services include "on-demand computing", "software as a service (SaaS)", "platform computing", "network accessible platform", and so forth.

In the current example, the cloud-based system 500 may also include one or more communication interfaces 502 configured to facilitate communication between one or more networks, one or more alert devices, one or more electronic devices, and/or one or more third party systems. The communication interfaces 502 may support both wired and wireless connection to various networks, such as cellular networks, radio, WiFi networks, short-range or near-field networks (e.g., Bluetooth®), infrared signals, local area networks, wide area networks, the Internet®, and so forth.

The cloud-based system 500 may also include one or more processors 504, such as at least one or more access components, control logic circuits, central processing units, or processors, as well as one or more computer-readable media 506 to perform the function associated with the alert system. Additionally, each of the processors 404 may itself comprise one or more processors or processing cores.

Depending on the configuration, the one or more computer-readable media 506 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 504.

Several modules such as instruction, data stores, and so forth may be stored within the one or more computer-readable media 414 and configured to execute on the processors 504. For example, as illustrated, the one or more computer-readable media 506 store alert instructions 508, third-party notification instructions 510, user portal instructions 512, threat assessment instructions 514, and location determining instructions 516, identification instructions 518 as well as other instructions.

The computer-readable media 506 may also store data, such as contact data 520 (e.g., contact information for individuals associated with a particular user), image/sensor data 522 (e.g., data reached from alert or electronic devices), third-party data 524 (e.g., data associated with the responders), location data 526 (e.g., position information associated with the electronic device, user, and/or alert device), and alert device data (e.g., data associated with a communicatively coupled or paired alert device).

The alert instructions 508 may receive an alert from an alert device and/or an electronic device associated with an alert device. The alert instructions 508 may then identify responders, third-party systems, cloud-based system, or other devices associated with the alert system within a physical area around the user requesting assistance and send the identified entities an alert. The alert instructions 508 may identify the entities via the contact data 520, the image/sensor data 522, third-party data 524, or the location data 526.

The third-party notification instructions 510 may be configured to send an alert or notification to entities or individuals selected by the user within the contact data 426 in the situation in which electronic device does not provide user conformation within a period of time or at a designated time, as discussed above.

The user portal instructions 512 may allow the user to designate responders, add contacts to the contact data 520, update electronic devices identifies associated with the user's account, set times period associated with check in or notifications, update personal information, etc.

The threat assessment instructions 514 may be configured to determine a threat or danger level associated with the instance of the alert. For example, the threat assessment instructions 514 may process the image/sensor data 522 received as part of an alert to determine a life or death risk to the user and to send out responders based on the threat level. For example, a user that is able to message, "I am stuck but OK," may be queued at a lower threat level than a user who is visibly bleeding in the image data. In some cases, the threat assessment instructions 514 may provide a level (such as 1-10) to the alert based on the image/sensor data 522. In some cases, if the threat level is greater than a threat threshold, the threat assessment instructions 514 may cause the cloud-based system 500 to escalate the alerts when sent to emergency responders.

Location determining instructions 516 may use location data 526 received from the alert device or the electronic device to determine a location of the user requesting assistance and to assist in selecting responders to send the alert to. In some cases, the location determining instructions 516 may be configured to determine if a plurality of alerts received from a plurality of users are within a predefined or threshold distance from each other. In the situation in which multiple alerts are received within a threshold distance, the location determining instructions 516 may determine a hostile individual or larger emergency is being reported.

In the cases of a larger emergency, the location determining instructions 516 may cause the alert instructions 508 to send alerts to various law enforcement officials and/or personal, campus or area personal or security, etc. The location determining instructions 516 may attempt to triangulate a position of a hostile individual or, for instance, shooter and provide the location as part of the alerts 210 and/or the notification 202. For instance, the location data 524 or position may then be sent, as well as the sensor/image data 522 as part of the alerts to assist emergency responders in identifying the location of the hostile individual.

The identification instructions 518 may be configured to utilize sensor/image data 522 received from one or more alert devices to attempt to identify or provide images of the hostile individual or the emergency situation. In one instance, the identification instructions 518 may parse and/or correlate image data 214 collected by multiple active devices or the accoupling devices to identify a common individual. In another instance, the identification instructions 518 may parse the image or sensor data 522 to detect specific objects, such as weapons, masks, etc. or clues, such as hostile body language, in identifying the hostile individual.

In the cases of the hostile individual, the identification instructions 518 may cause the alert instructions 508 to notify designated or specific personal (such as law enforcement, fire response, health officials, facility, campus personal, others trained for emergency repose situations). For example, if a fire is identified from the image or sensor data 522, then the notification instructions 518 may cause the alert instructions 508 to alert fire responders, while if an active shooter is identified from the image or sensor data 522, then the notification instructions 518 may cause the alert instructions 508 to alert policy and/or security responders.

Figure 6:
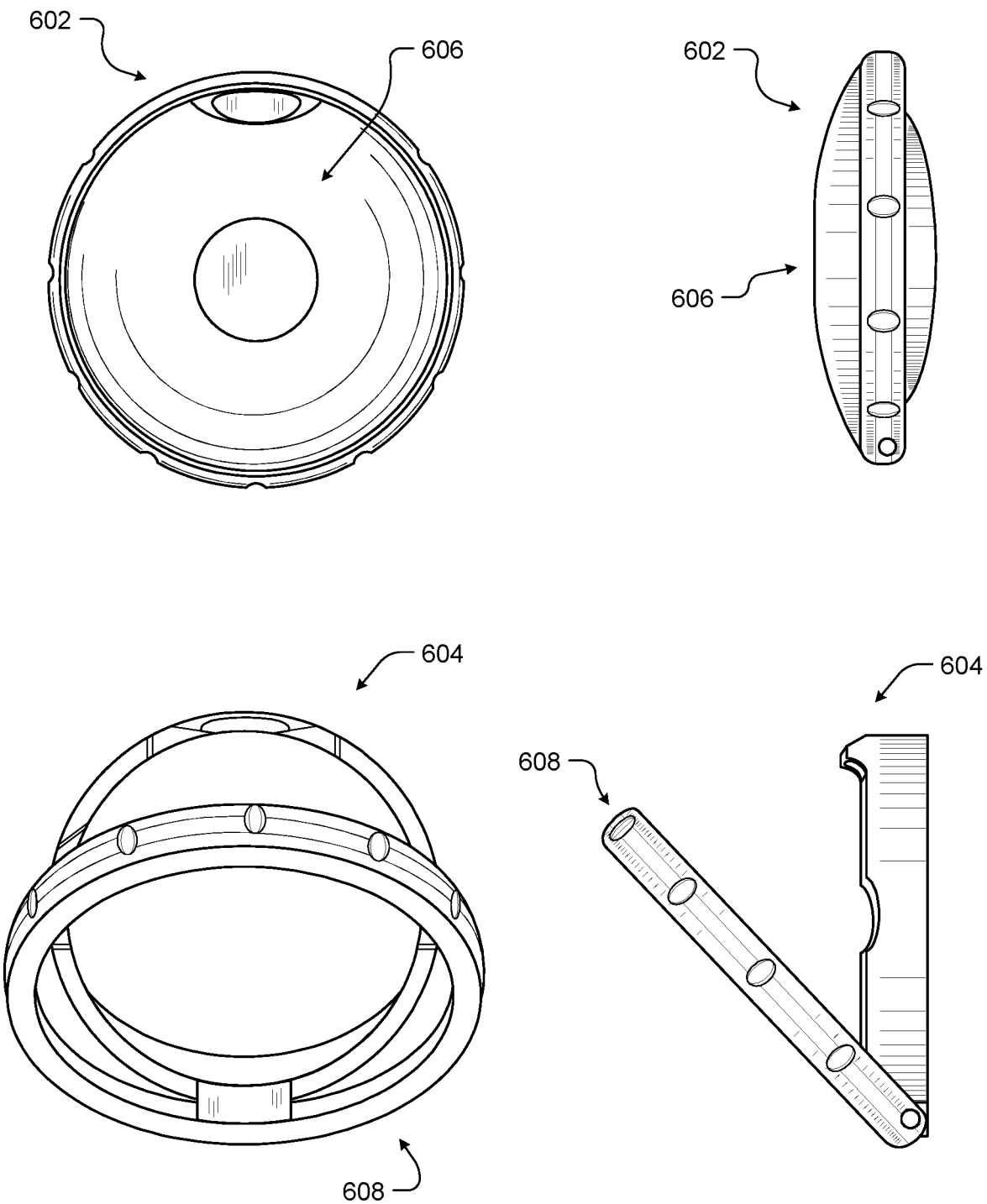
FIG. 6 illustrates an example alert device and saddle according to some implementations.

FIG. 6 illustrates an example alert device 602 and saddle 604 according to some implementations. As discussed above, the alert device 602 may be configured to cause a nearby electronic device to send an alert to various responders (e.g., emergency personnel, nearby users of the system, or pre-selected individuals, among others) in response to an activation. Thus, the alert device 602 includes at least one user input device 606, such as a mechanical input device (e.g., depressible button, slidable button, rotatable button, or other actable component) or touch enabled component or sensor (e.g., pressure sensor, capacitive touch sensor, resistive touch sensor, etc.), to allow the user to activate the alert device 602 and cause the electronic device to send the alert to the various responders and/or systems.

In the illustrate example, the alert device 602 is configured to releasably couple to the saddle 604. For instance, the illustrated saddle 604 includes a locking ring 608 that allows the user to place the alert device 602 within the saddle 604 and secure the alert device 602 within the saddle 604 by closing the locking ring 608. The saddle 604 may also be configured to attach or adhere to various surfaces, such as the back of the paired electronic devices, belt clips, backpacks, boots, gloves, etc. For instance, the saddle 604 may include an adhesive strip that may be used to permanently affix the saddle 604 to the back surface of the electronic device. Thus, by including the saddle 604 and the alert device 602 as separate components, the alert device 602 may be removed from the saddle 604 in various instances.

For example, if the alert device 602 is damaged and needs to be replaced the saddle 604 (e.g., the component adhered to the electronic device) does not need to be replaced. Rather, the user may remove the damaged alert device 602 and insert into the saddle 604 a new alert device 602 that may be paired to the electronic device and synced with the alert application hosted on the electronic device. Likewise, if the alert device 602 is manufactured as a sealed or disposable unit, the user may discard the alert device 602 when, for example, the battery is depleted without affecting the saddle 604 or the electronic device to which the saddle 604 is attached. In yet another example, if the electronic device is used by multiple individuals, such as a family smart phone shared between siblings, then each particular sibling may insert the alert device 602 associated with them into the saddle 604 when the particular sibling is using the electronic device. In still other examples, the user may desire to remove the alert device 602 from the electronic device when the user puts the electronic device away (such as in the user's backpack) but desires the alert device 602 remain within easy access. For instance, during a dinner date, the user may desire to put the electronic device away in order to be polite but the user may remove the alert device 602 from the saddle 604 adhered to the electronic device, to keep the alert device 602 at a location that the user may quickly activate the alert device 602. Thus, the alert system, discussed herein, provides a flexible alert device 602 that may be used with multiple electronic devices, shared between users, and keep at locations at which the user may easy activate across a wide range of situations.

Figure 7:
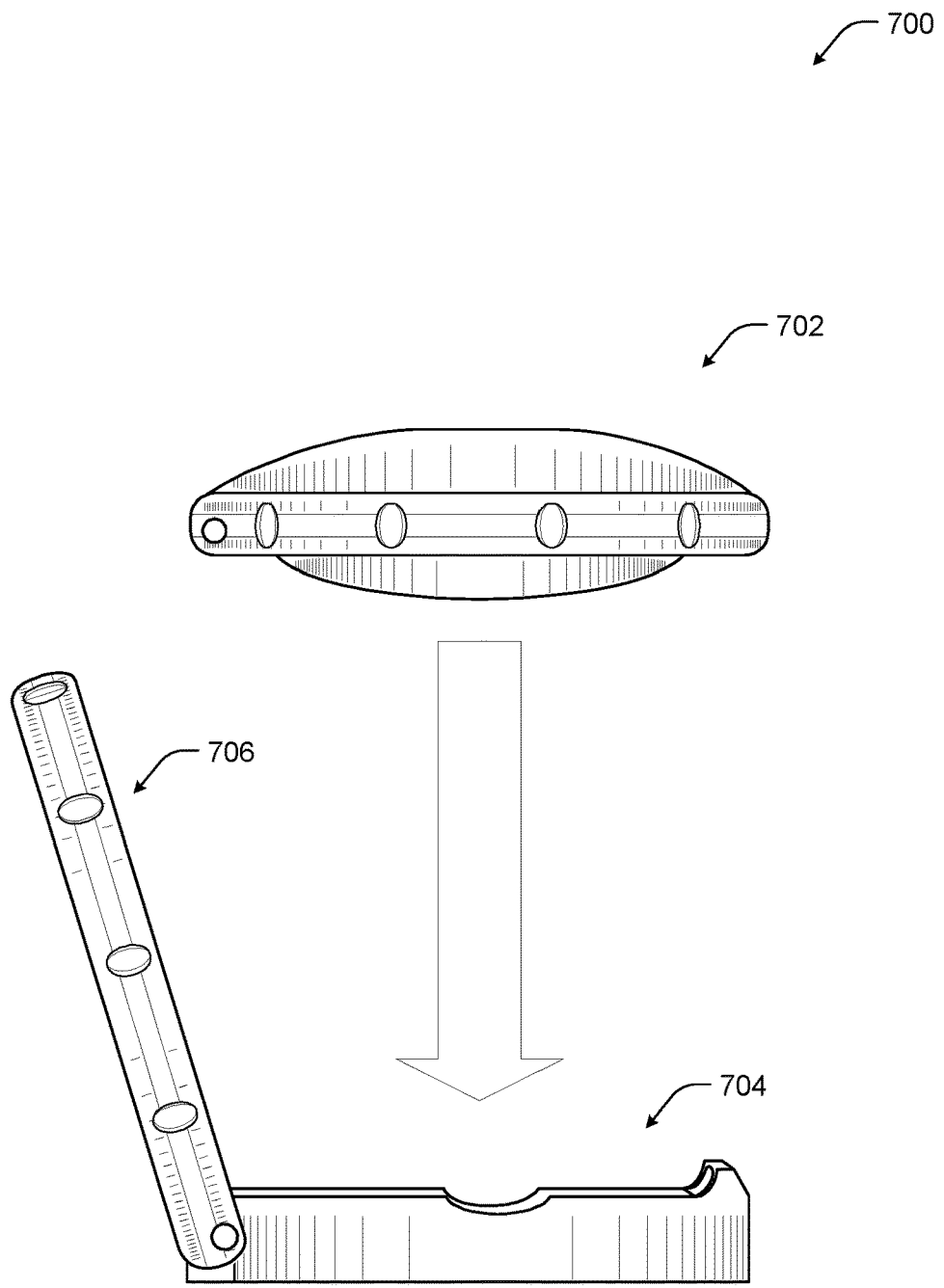
FIG. 7 is an example pictorial view of an alert system including an alert device removed from the saddle according to some implementations.

FIG. 7 is an example pictorial view of an alert system 700 including an alert device 702 removed from the saddle 704 according to some implementations. In the current example, the alert device 702 is removed from the saddle 704. As discussed above, the alert device 702 may be inserted into the saddle 704 and secured within the saddle 704 via the locking ring 706. In the current example, the locking ring 706 is a clasp. However, it should be understood that various other types of locking mechanism may be used in lieu of the locking ring 706. For example, the locking mechanism may include clips, snap connectors, screw connectors, hook and loop connectors, latches, or pressure based connections (such as rubber or fitted polymer portions of the saddle 704).

In one particular example, the saddle 704 may be configured to provide a grip or hold for assisting the user in holding and operating the attached electronic device. Additionally, in the examples discussed herein, the saddle 704 is illustrated as a circular component that may attach to a surface of an electronic device or case applied to an electronic device. However, in some implementations, the saddle 704 may be integrated into the electronic device case.

It should also be understood that while the saddle 704 and alert device 702 are shown as round, the saddle 704 and/or alert device 702 may take on various form factors, such as square, hexagon, octagon, triangle, oval, or even other irregular shapes.

FIG. 8 is an example pictorial view of a saddle 802 and 804 with accessory clips 806 and 808 according to some implementations. For example, rather than adhering to a surface, such as the back of an electronic device or smart phone, the saddles 802 and 804 may be coupled to one or more accessory clips, generally indicated by 806 and 808. For instance, in the current example, the saddle 802 is coupled to a belt clip 806 and the saddle 804 coupled to a backpack or clothing clip 808.

Thus, in the current example it should be understood, that the type of clip (e.g., size, width, and length) may be varied with respect to the saddles 802 and 804, such that the saddles 802 and 804 may be releasably coupled to various articles to keep the alert device (not shown) within easy access of the user.

Figure 9:
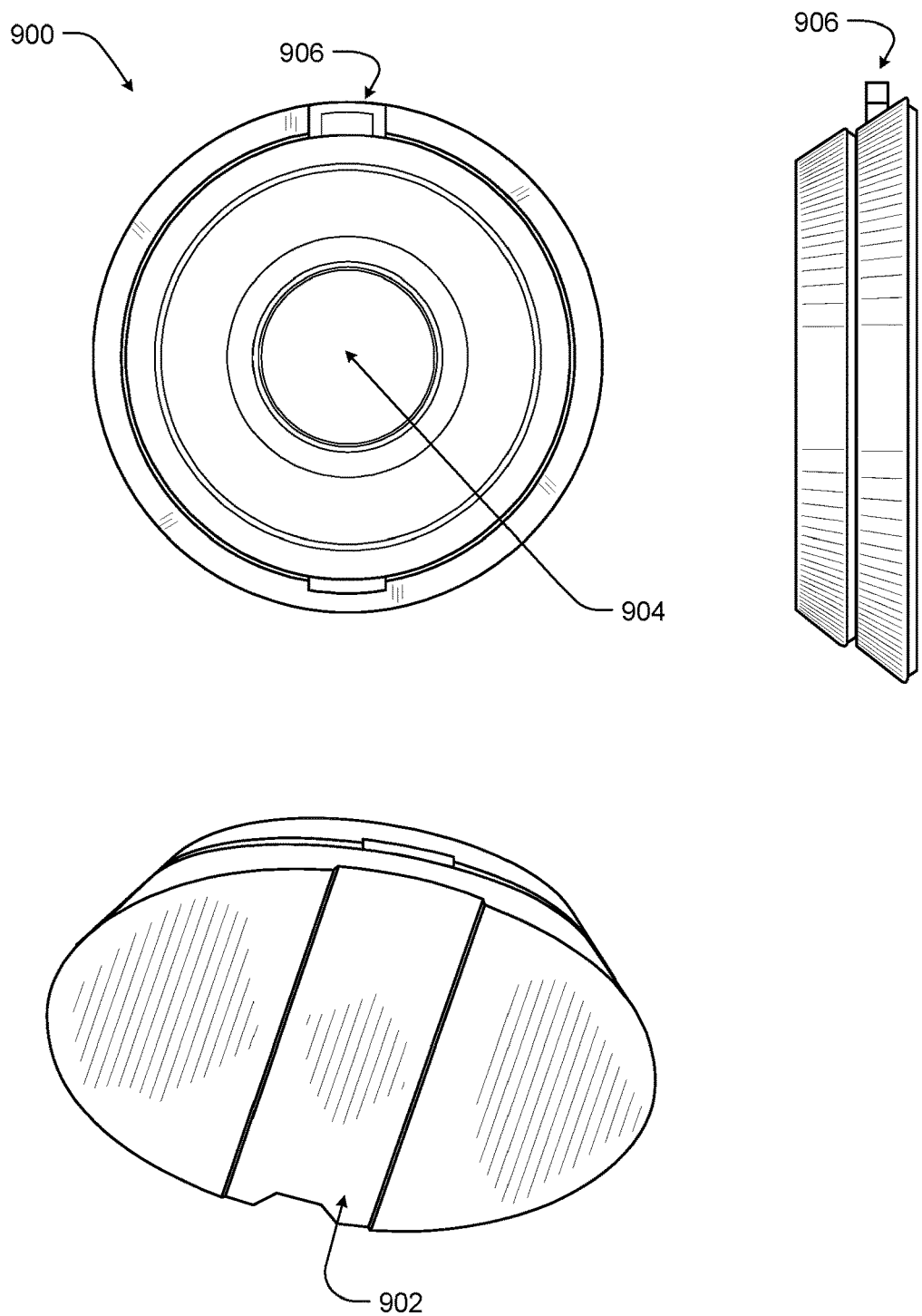
FIG. 9 illustrates another example alert device according to some implementations.

FIG. 9 illustrates another example alert device 900 according to some implementations. In the current example, the saddle and alert device 900 may be combined into a single component. For instance, similar to the saddle discussed above, the alert device 900 includes a receptacle or groove 902 for coupling to various accessory or belt clips. Additionally, the receptacle or groove 902 may also be used to place an adhesive that may be applied to a surface, such as the back of an electronic device or smart phone.

In some cases, the alert device 900 includes at least one user input device 904, such as a mechanical input device (e.g., depressible button, slidable button, rotatable button, or other acceptable component) or touch enabled component or sensor (e.g., pressure sensor, capacitive touch sensor, resistive touch sensor, etc.), to allow the user to activate the alert device 900 and cause the electronic device to send the alert to the various responders and/or systems. The alert device 900 may also include a bracket 906 that may be used to attach various components, in addition, to the groove 902. For example, the bracket 906 may be used to connect a necklace or key chain, as will be discussed in more detail below.

In some cases, the alert device 900 as well as the alert device 600 and 700 discussed above, may be between one inch and three inches in diameter and between 0.25 inches and one inch thick or tall. In one particular example, the alert device 900, 600, and/or 700 may be approximately two inches in diameter and 0.5 inches tall. The alert devices 900, 600, and/or 700 may also be less than 0.01 pounds. Thus, the alert devices 900, 600, and/or 700 are light and easy to carry on clothing, in the hand, or around the neck. The alert devices 900, 600, and/or 700 also add little weight when attached to the electronic device.

Figure 10:
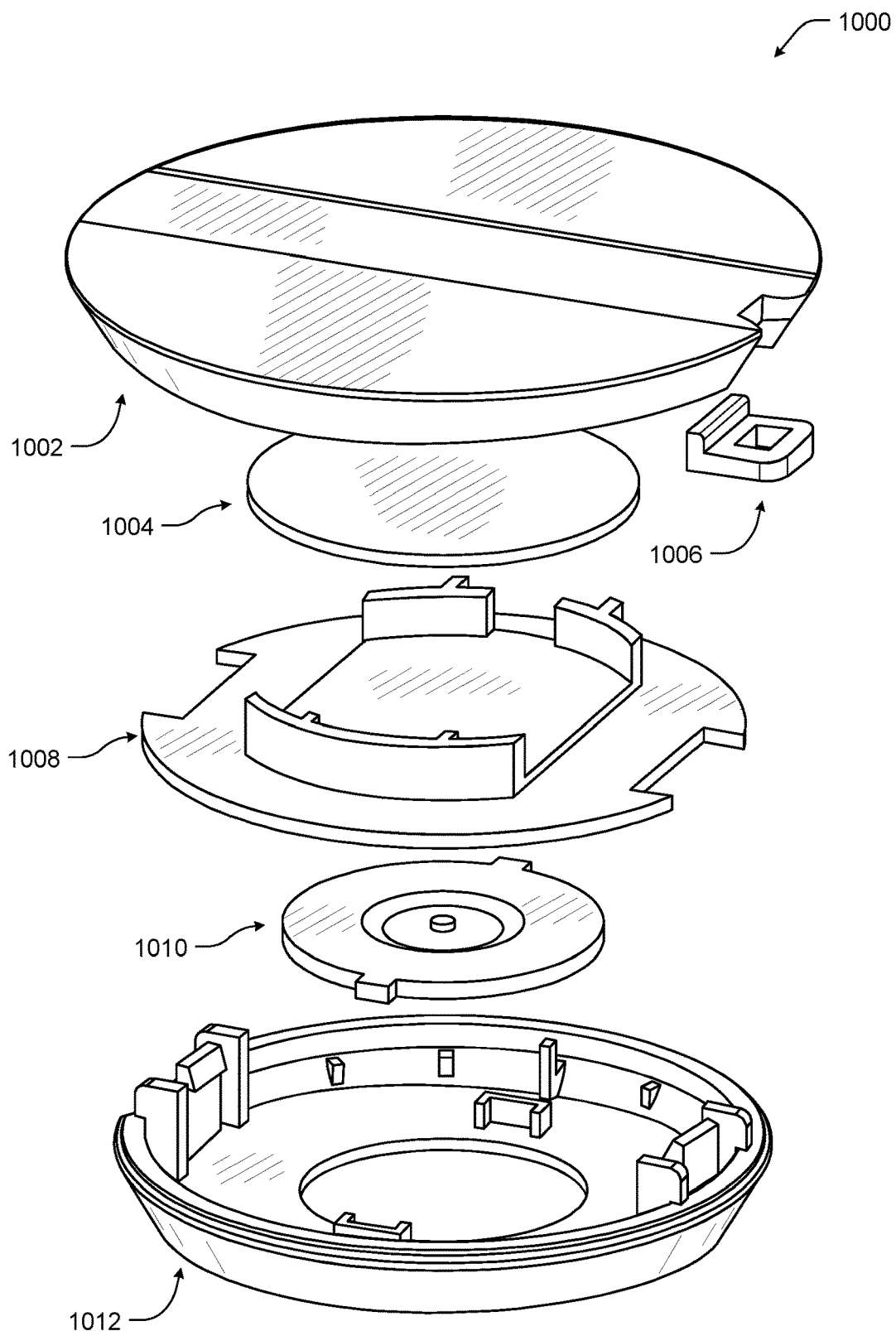
FIG. 10 illustrates an example exploded cross-sectional view of an alert device according to some implementations.

FIG. 10 illustrates an example exploded cross-sectional view of an alert device 1000 according to some implementations. In the current example, the alert device 1000 includes a pod back 1002 and a pod face 1012. The pod back 1002 may be positioned above a battery 1004 and the pod back 1002 may be removable from the pod face 1012 such that the battery 1004 may be replaced or recharged. The alert device 1000 may also include a bracket or coupler 1006 for coupling the alert device 1000, for instance, to a necklace or key chain. The battery 1004 may be configured to mount within a surface mount assembly 1008.

One or more input devices or components 1010 may be positioned below the assembly 1008. The input devices or components 1010 may be depressed by the user to cause the alert device 1000 to activate and cause the communicatively coupled electronic device to send the alert to the cloud-based system or various responders, as discussed above. In some cases, the alert device 1000 may include one, two, three, four, eight, ten, input devices 1010. Each of the input devices 1010 may then be used to perform various operations associated with the communicatively coupled electronic device.

Figure 11:
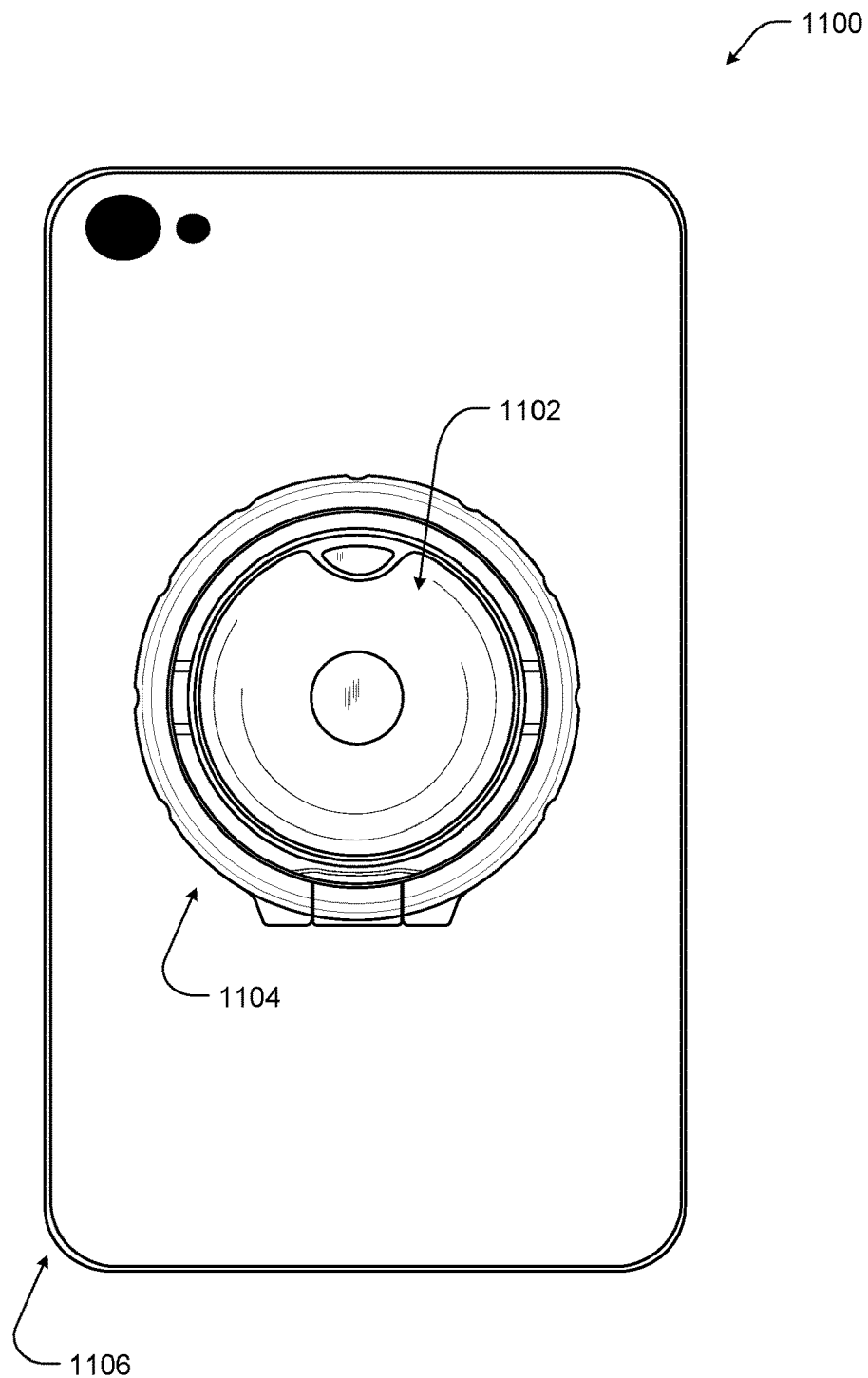
FIG. 11 is an example pictorial view of the alert device and saddle coupled to an electronic device according to some implementations.

FIG. 11 is an example pictorial view of an alert system 1100 including an alert device 1102 and saddle 1104 coupled to an electronic device 1106 according to some implementations. As discussed above, the alert system 1100 may be configured such that the user may select or depress the button of the alert device 1102 to cause the alert device 1102 to further cause the electronic device 1106 to send an alert to a cloud based system or various other responders. In some cases, the saddle 1104 may be configured to mount or adhere to the electronic device 1106, as shown, such that the alert device 1102 when coupled to the saddle 1104 is at a position that is easily activatable by the user.

Figure 12:
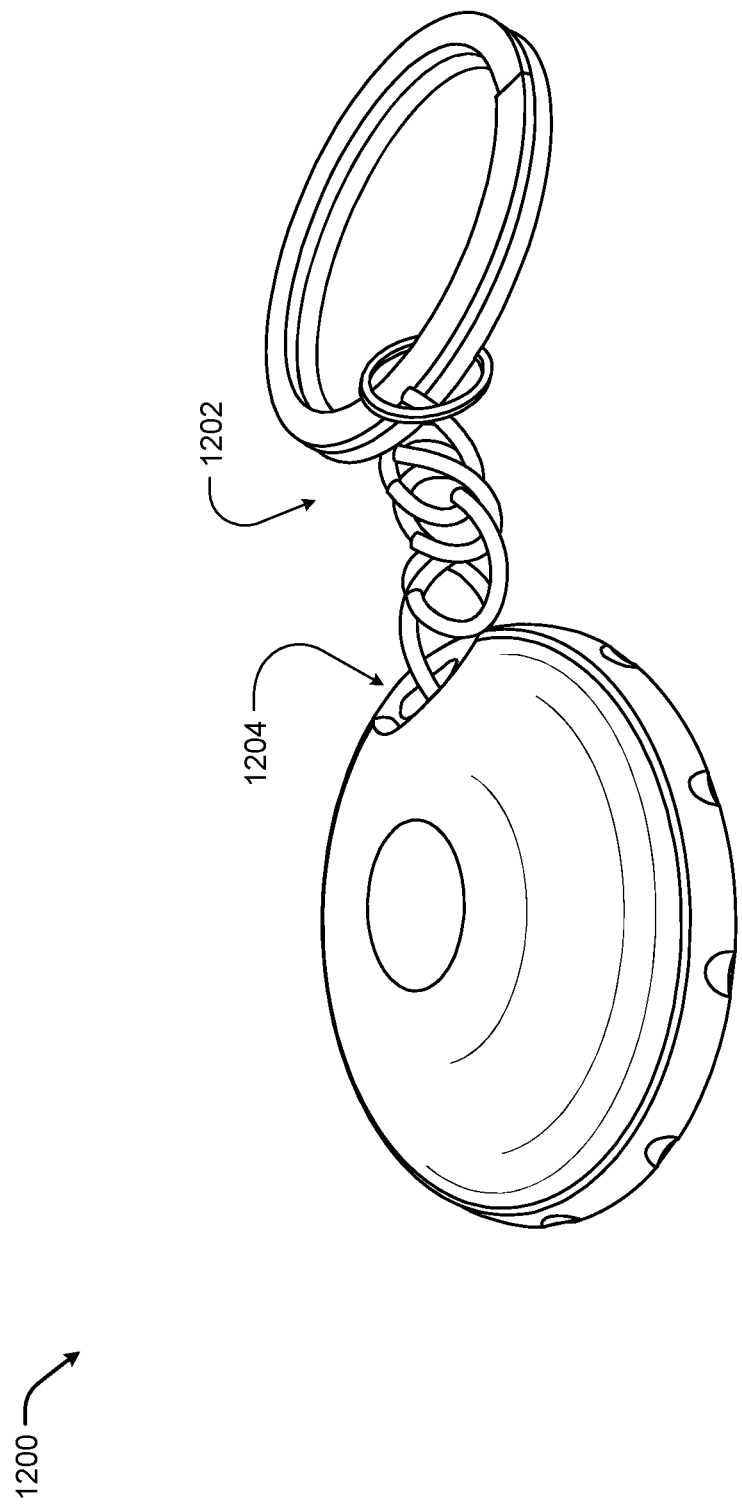
FIG. 12 is an example pictorial view of alert device with accessory chain according to some implementations.

FIG. 12 is an example pictorial view of alert device 1200 with accessory chain 1202 according to some implementations. As discussed above, in some situations, the electronic device may be put away (such as within a purse or backpack) but the user desires that the alert device 1200 remain at a location at which the user may easily activate the alert system. In these situations, the alert device 1200 may be coupled to the accessory chain 1202 via a bracket 1204 and the accessory chain 1202 may then be coupled to the exterior of the purse or backpack or around a belt loop on a pair of paints.

In some cases, the user may configured multiple alert devices, such as alert device 1200 coupled to the exterior of a backpack and alert device 1102 coupled to the electronic device, to be communicatively coupled to the electronic device. In these cases, the user may activate any of the multiple alert devices to trigger the alert and to request aid from the responders.

Figure 13:
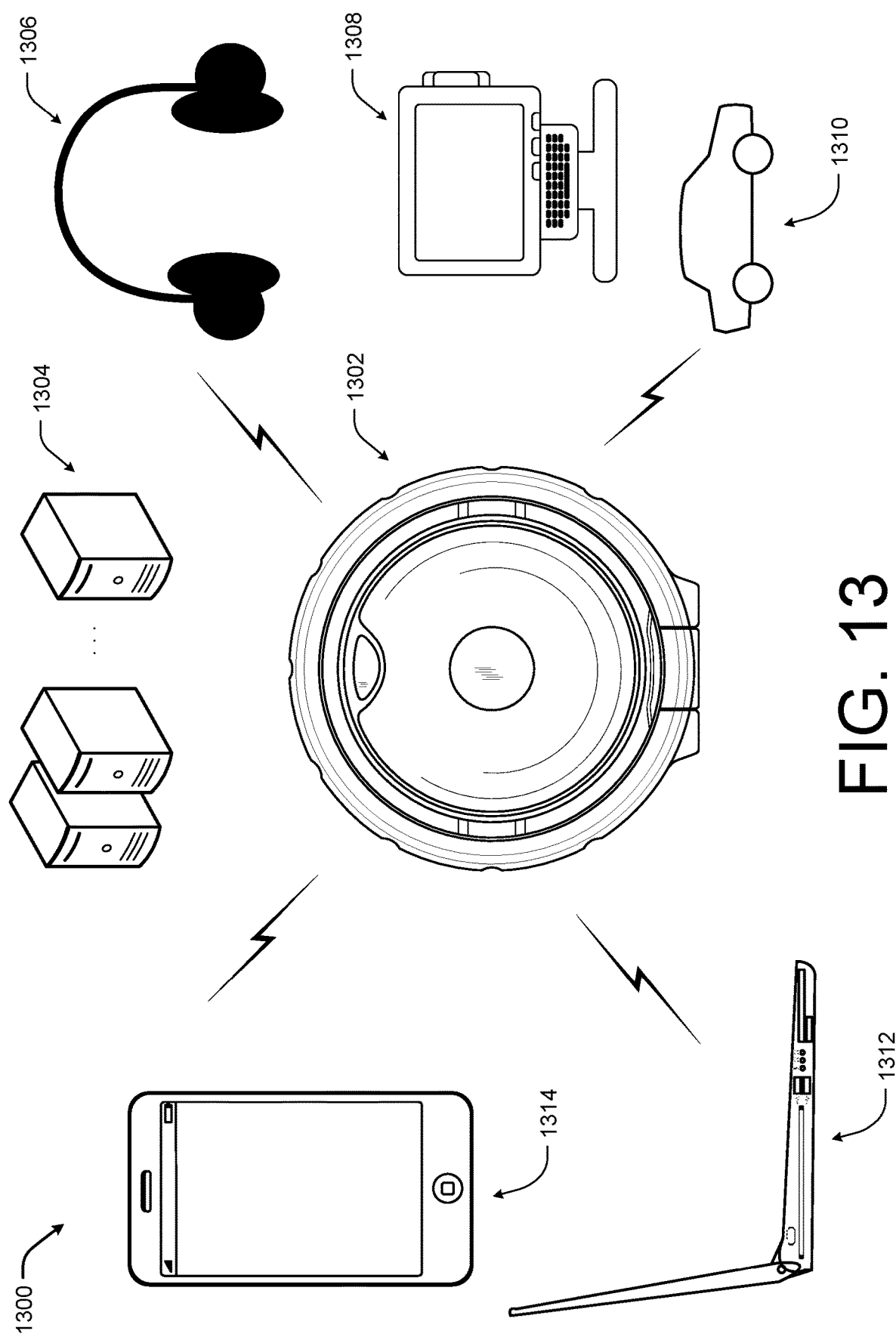
FIG. 13 is an example block diagram of the alert device in communication with various wireless enabled devices according to some implementations.

FIG. 13 is an example block 1300 diagram of the alert device 1302 in communication with various wireless enabled devices 1304-1314 according to some implementations. For example, the alert device 1302 may be configured to communicatively or wirelessly communicatively couple to desktop computers or servers 1304, headsets 1306, point of sales devices 1308, smart vehicles 1310, portable computing devices 1312, and smart phones or tablets 1314. While the devices 1304-1314 illustrate a wide range of devices it should be understood that the alert device 1302 may communicatively couple to other devices, such as drones, e-readers, etc.

In some implementations, the alert device 1302 may be configured to communicatively couple to multiple devices and to provide different types of control signals to different devices based at least in part on a number of user inputs. For example, the alert device 1302 may start the smart car 1310 if one user input is detected within a predefined period while the alert device 1302 may unlock the smart phone 1314 if two user inputs are detected within the predefined period. In other cases, as discussed above the alert device 1302 may cause one or more of the devices 1304-1314 to send an alert to a cloud-based system, nearby devices, or third-party systems (such as emergency responder systems).

Figure 14:
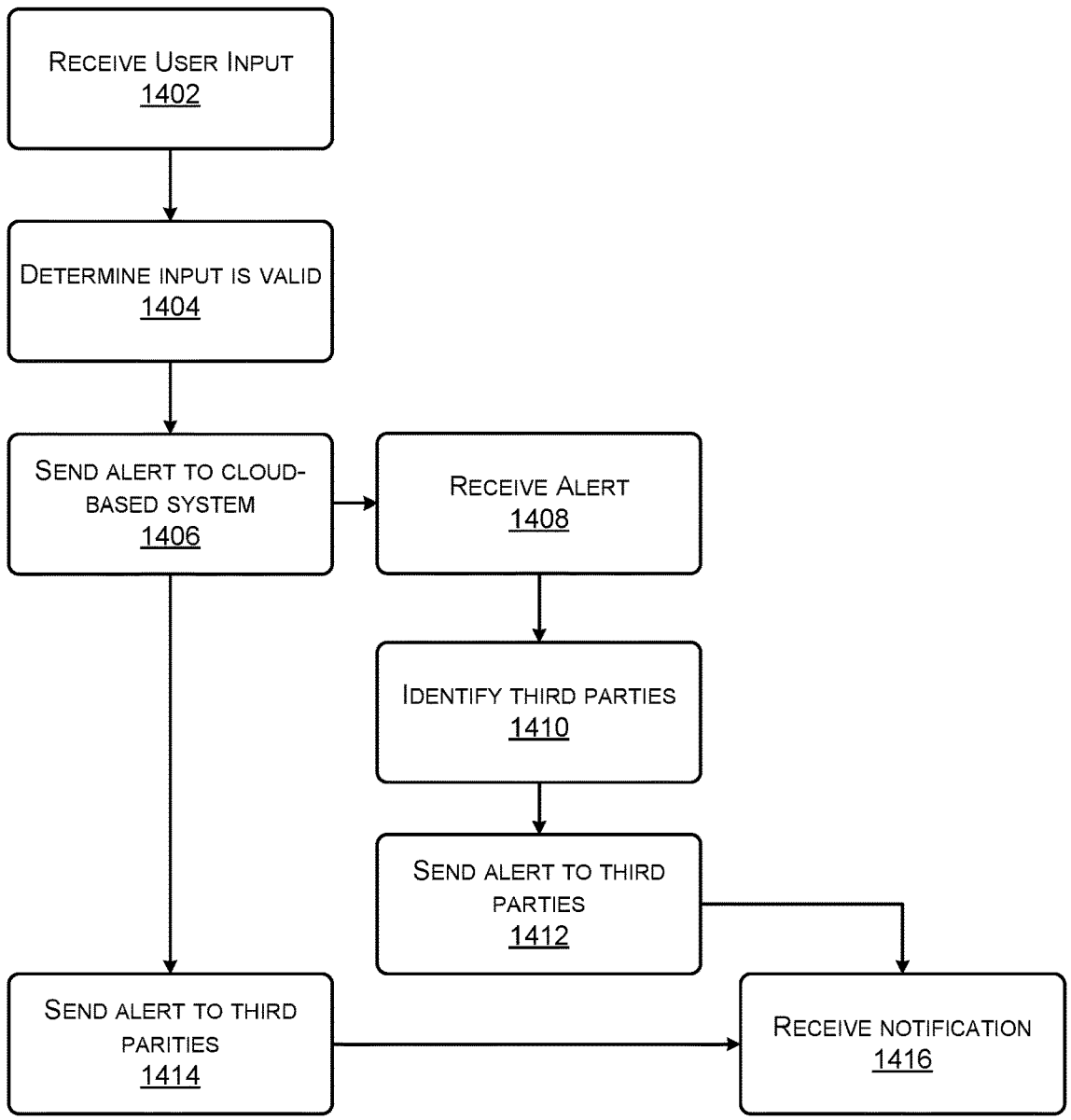
FIG. 14 is an example flow diagram of a process associated with the alert system according to some implementations.

FIG. 14 is a flow diagram illustrating example processes associated with the alert system discussed herein according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures, and environments described in the examples herein, although the processes may be implemented in a wide variety of other frameworks, architectures or environments.

FIG. 14 is an example flow diagram of a process 1400 associated with the alert system according to some implementations. As discussed above, the alert system may include an alert device wireless communicatively coupled to an electronic device (e.g., a smart phone, tablet, or other mobile device) such that in response to a user input at the alert device, the alert device may cause the electronic device to contact third parties and/or a cloud-based system.

At 1402, the alert system may receive a user input and at 1404, the alert device determines the input is valid. For example, the user may depress or select an input device on the exterior of the alert device. In some cases, the alert device may require a threshold (such as three) user inputs before triggering an alert or emergency event. In some cases, the alert device may determine the input is valid in other cases an application hosted on the electronic device may determine the input is valid.

At 1406, the alert device and/or the electronic device may send alert to cloud-based system and, at 1408, the cloud-based system may receive the alert.

At 1410, the cloud-based system may identify third parties (such as friends, family, emergency responders, or volunteer responders within a predefined distance of the user). The cloud-based system may select the third parties based on data previously provided by the user, image data, sensor data, or audio data received from the alert device and/or electronic device, and data received from the emergency responders networks (such as locations of fire or policy rescue personnel), among others.

At 1412, the cloud-based system may send alert to third party responders. For example, the cloud-based system may alert the identified third parties as to the emergency associated with the user. In some cases, the cloud-based system may provide location data, image data, audio data, sensor data, as well as a threat assessment to the responders.

Similarly, at 1414, the alert device and/or the electronic device may send the alert to third party responders. For example, the electronic device may transmit the alert to other volunteer responders in the vicinity to the user.

At 1416, the third-party responders receive the notification. For instance, the volunteer responders may be notified via an application on their associated electronic device as to the emergency. In some case, the volunteer responders may have selected a predefined que (such as vibration, a song, ring tone, etc.) that the device may emit in response to receiving the alert signal.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A system comprising:
one or more processors; and
one or more non-transitory computer readable media storing instructions executable by the one or more processors, wherein the instruction, when executed, cause the system to perform operations comprising:
receiving, at a cloud-based system, an alert sent from a first remote device associated with a user, the alert including an identifier and location data and the first remote device comprising a saddle for receiving and securing the first remote device to a second remote device, the saddle comprising a locking mechanism movable to receive and secure the first remote device when locked, a first input device accessible to a user, and wherein the alert is sent in response to the first remote device determining the first input device has been enabled by detecting greater than a threshold number of activations within a threshold period of time;
determining a user account associated with the user based at least in part on the identifier;
identifying a first third party associated with the user account, the first third party system being an emergency contact indicated by the user; and
sending a first notification to a second remote device associated with the first third party.

2. The system of claim 1, the operations further comprising:
receiving sensor data from the first remote device;
determining from the sensor data a threat level associated with the alert;
determining the threat level is greater than a threshold; and
wherein sending the second notification is in response to determining that the threat level is greater than the threshold.

3. The system of claim 1, the operations further comprising sending a second notification to a third remote device, the third remote device associated with an emergency responder.

4. The system of claim 3, the operations further comprising:
determining the user account is assorted with a particular network; and
wherein the third remote device is selected based at least in part on the particular network.

5. The system of claim 1, the operations further comprising:
receiving sensor data from the first remote device;
determining from the sensor data a threat is associated with a hostile individual; and
wherein sending the second notification is in response to determining that the threat is associated with the hostile individual.

6. The system of claim 1, wherein the first remote device is at least one of an alert device.

7. A method comprising:
receiving, at a cloud-based system, an alert from an alert device associated with a user at least in part via a second device, the alert including an identifier and location data, the second device in physical proximity to the alert device, and the alert device comprising:
a first input device;
one or more non-transitory computer readable media storing instructions executable by one or more processors of the alert device, wherein the instruction, when executed, cause the alert device to perform operations comprising in response to detecting greater than a threshold number of activations of the first input device within a threshold period of time, causing the second device to send the alert; and
a saddle for receiving and securing the alert device to the second device, the saddle comprising a locking mechanism to receive and secure the alert device when locked;
determining a user account associated with the user based at least in part on the identifier;
identifying a first third party associated with the user account, the first third party system being an emergency contact indicated by the user;
sending a first notification to a second remote device associated with the first third party; and
sending a second notification to a third remote device, the third remote device associated with an emergency responder.

8. The method of claim 7, wherein the second device is a mobile device associated with an alert device.

9. The method of claim 7, further comprising:
receiving sensor data from at least one of the alert device or the second device;
determining from the sensor data a threat level associated with the alert;
determining the threat level is greater than a threshold; and
wherein sending the second notification is in response to determining that the threat level is greater than the threshold.

10. The method of claim 7, wherein the alert, the first notification, and the second notification include location data.

11. The method of claim 10, further comprising:
receiving, at the cloud-based system, a plurality of additional alerts from a plurality of additional users, individual ones of the plurality of additional alerts including location data;
determining that greater than a threshold percentage of the plurality of additional alerts are within a threshold distance of each other; and
wherein sending the second notification is in response to determining that the threshold percentage is within a threshold distance.

12. The method of claim 10, further comprising:
receiving, at the cloud-based system, a plurality of additional alerts from a plurality of additional users, individual ones of the plurality of additional alerts including location data and sensor data;
determining a location based in part on the location data of the plurality of additional alerts;
determining from the sensor data a type of emergency; and
selecting the emergency responders from a plurality of emergency responders based at least in part on the type of emergency and the location.

13. The method of claim 7, further comprising:
receiving sensor data from at least one of the alert device or the second device;
determining from the sensor data a threat is associated with a hostile individual; and
wherein sending the second notification is in response to determining that the threat is associated with the hostile individual.

14. The method of claim 7, wherein
the one or more non-transitory computer readable media stores additional instructions executable by the one or more processors, wherein the additional instruction, when executed, cause the system to perform operations comprising:
determine the first input device has been enabled in response to detecting greater than the threshold number of activations; and
wherein causing the second device to send the alert is based at least in part to determining the first input device has been enabled.

15. An alert system, comprising:
an alert device, the alert device comprising:
a first input device accessible to a user along a first surface;
a short range wireless communication interface in communication with a second device;
one or more processors; and
one or more non-transitory computer readable media storing instructions executable by the one or more processors, wherein the instruction, when executed, cause the system to perform operations comprising:
determine the first input device has been enabled by detecting greater than a threshold number of times of activations within a threshold period of time;
in response to determine the first input device has been enabled, causing the second device to send an alert to a remote cloud-based system;
a saddle for receiving and securing the alert device to the second device, the saddle comprising:
a substrate having a first surface and a second surface, the second surface opposite the first surface and wherein the second surface is in contact with the second device when the electronic device is secured to the second device; and
a locking mechanism movable coupled to the first surface, the locking mechanism to receive and secure the alert device when locked.

16. The alert system of claim 15, wherein the input device is at least one of a mechanical, capacitive, pressure, or resistive input device.

17. The alert system of claim 15, wherein the locking mechanism is a ring.

18. The alert system of claim 15, wherein the second surface of the saddle is secured to the second device via at least one of an adhesive layer or a magnetic component.

19. The alert system of claim 15, wherein the alert device includes a long range wireless communication interface in communication with the remote cloud-based system.

20. The alert system of claim 15, wherein the alert device includes at least one sensor for capturing sensor data from a physical environment surrounding the electronic device.

* * * * *